US008353047B2

(12) United States Patent
Ferlitsch (10) Patent No.: US 8,353,047 B2
(45) Date of Patent: Jan. 8, 2013

(54) METHODS AND SYSTEMS FOR DIGITAL IMAGE DATA TRACKING (75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1460 days.

(21) Appl. No.: 11/608,572

(22) Filed: Dec. 8, 2006

(65) Prior Publication Data
US 2008/0137129 A1 Jun. 12, 2008

(51) Int. Cl.
*G06F 17/30* (2006.01)
(52) U.S. Cl. .............. 726/26; 726/29; 705/65; 358/1.15
(58) Field of Classification Search .............. 358/1.15; 705/50, 51, 65; 726/26
See application file for complete search history.

(56) References Cited

U.S. PATENT DOCUMENTS

| 5,671,282 | A | 9/1997 | Wolff et al. |
| 5,768,483 | A | 6/1998 | Maniwa et al. |
| 6,115,739 | A | 9/2000 | Ogawa et al. |
| 6,223,223 | B1 | 4/2001 | Kumpf et al. |
| 6,437,875 | B1 | 8/2002 | Unno |
| 6,952,281 | B1 * | 10/2005 | Irons et al. ............. 358/1.15 |
| 2002/0085244 | A1 | 7/2002 | Blasio et al. |
| 2003/0046445 | A1 | 3/2003 | Witt et al. |
| 2003/0117664 | A1 | 6/2003 | McCarthy |
| 2003/0217008 | A1 * | 11/2003 | Habegger et al. ............. 705/51 |
| 2004/0083260 | A1 | 4/2004 | Kobayashi et al. |
| 2004/0114175 | A1 * | 6/2004 | Cherry et al. ............. 358/1.15 |
| 2004/0263898 | A1 * | 12/2004 | Ferlitsch ............. 358/1.15 |
| 2005/0031162 | A1 * | 2/2005 | Sagi et al. ............. 382/101 |
| 2005/0078336 | A1 | 4/2005 | Ferlitsch |
| 2005/0081137 | A1 | 4/2005 | Ferlitsch |
| 2005/0108280 | A1 * | 5/2005 | Kagle et al. ............. 707/103 R |
| 2006/0218188 | A1 * | 9/2006 | Duncan et al. ............. 707/104.1 |
| 2007/0027818 | A1 * | 2/2007 | Lofgren et al. ............. 705/65 |
| 2007/0198632 | A1 * | 8/2007 | Peart et al. ............. 709/203 |

FOREIGN PATENT DOCUMENTS

| EP | 1096775 A2 | 5/2001 |
| JP | 10289308 | 10/1998 |
| WO | WO0195609 A1 | 12/2001 |

OTHER PUBLICATIONS

Chipless ID for Paper Documents; Daniel Lopresti and George Nagy;Department of Computer Science and Engineering; Lehigh University, Bethlehem, PA 18015 USA;2005, http://www.cse.lehigh.edu.*

* cited by examiner

*Primary Examiner* — Thanhnga B Truong
*Assistant Examiner* — Jason Lee
(74) *Attorney, Agent, or Firm* — Kristine Elizabeth Matthews; David C. Ripma (57) ABSTRACT

Embodiments of the present invention comprise systems and methods for notification handling in a processing server and an imaging device.

15 Claims, 6 Drawing Sheets

METHODS AND SYSTEMS FOR DIGITAL IMAGE DATA TRACKING

FIELD OF THE INVENTION

Embodiments of the present invention comprise methods and systems for digital image data tracking.

BACKGROUND

It is desirable to recognize the presence of digital image data on a processing server without a separate monitoring process. It is also desirable to track, over the entire lifecycle of a document comprising digital image data, the history of the document processing subsequent to the initial processing by the processing server.

SUMMARY

Some embodiments of the present invention comprise methods and systems for digital image data tracking comprising associating a document tracking identifier with digital image data, wherein the document tracking identifier comprises the communication address of the imaging device that generated the digital image data and a globally unique identifier.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention may comprise methods and systems for recognizing the presence of digital image data on a processing server without a separate monitoring process. Embodiments of the present invention may also comprise methods and systems to track, over the entire lifecycle of a document comprising digital image data, the history of the document processing subsequent to the initial processing by the processing server. Some embodiments of the present invention comprise methods and systems for digital image data tracking comprising associating a document tracking identifier with digital image data, wherein the document tracking identifier comprises the communication address of the imaging device that generated the digital image data and a globally unique identifier.

Embodiments of the present invention are described herein using scanned image data as exemplary digital image data and a scan server as an exemplary processing server. These descriptions are by way of illustration and not limitation. Exemplary digital image data may include, in addition to scanned image data, fax data, digital camera image data, digital image data generated by a print driver, and any other digital image data. Exemplary processing servers may include any server providing a processing function on digital image data.

Figure 1:
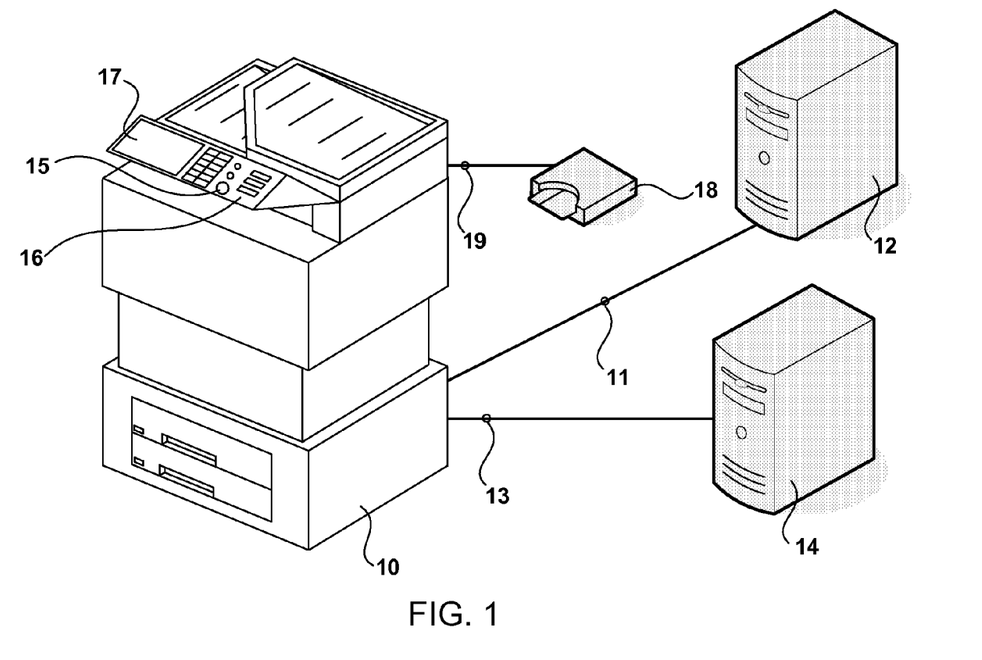
FIG. 1 is a drawing showing embodiments of the present invention comprising an imaging device, a remote computing device, and a scan server.

Exemplary embodiments of the present invention may be described in relation to FIG. 1. These exemplary embodiments may comprise an imaging device 10 comprising a scanning device. In some embodiments, the imaging device 10 may take the form of a multi-function peripheral device (MFP) that combines the functions of two or more traditionally separated imaging devices. An MFP may combine any number of imaging devices, but typically comprises the functions of a printer, scanner, copier and fax machine. In alternate embodiments, the imaging device 10 may take the form of a separate scanner. The imaging device 10 may be connected to a remote computing device 12 and a scan server 14. In some embodiments, the remote computing device 12 and the scan server 14 may be distinct. In alternate embodiments, the remote computing device 12 and the scan server 14 may be the same device.

The connection 11 between the imaging device 10 and the remote computing device 12 and the connection 13 between the imaging device 10 and the scan server 14 may be any communications link, such as a network connection, a telephone line, a serial cable or some other wired or wireless communications link.

The imaging device 10 may further comprise a user interface (UI) panel 16, which may comprise input buttons 15 and a display device 17. In some embodiments, the display device 17 may comprise a touch panel system with or without input buttons 15. User input and display may also be performed through a separate UI device 18 that may be connected to the imaging device 10 by a communication link 19, for example, a USB (Universal Serial Bus) connection, a network cable, a wireless connection or some other communications link. The UI device 18 may comprise an input device, such as a keyboard or buttons as well as a display device, which may also be a touch screen panel. The UI device 18 may also comprise an interface for transfer of instructions that are input to the device 18 from a remote input device. This form of UI device 18 may comprise memory sticks, USB memory cards and other storage devices that may be configured to store input for transfer to an imaging device. The display device 17 or UI device 18 may also be under the control of an external application, which may be hosted on the remote computing device 12, the scan server 14, or another computing host (not shown).

The imaging device 10 may comprise scan-to-destination capabilities. Scan-to-destination operations may comprise those in which a final or intermediate outcome is the delivery of digital image data. Exemplary operations may include copy, fax in, fax out, print, file transfer, scan, OCR (Optical Character Recognition), Bates stamping, and file format conversion. Exemplary destinations may include a print engine, a network path, a local storage medium, a local port, for example, a USB port, an electronic-mail (email) address, an FTP (File Transfer Protocol) site, a PSTN (Public Switched Telephone Network) and a URL (Uniform Resource Locator). Scan-to-destination capabilities may comprise loading a scan-to-destination profile on the imaging device 10, where the scan-to-destination profile effectuates the delivery of scanned image data to a specified folder on the scan server 14. Exemplary scanned image data formats include TIFF (Tagged Image File Format), TIFF-FX (Tagged Image File Format-FaX), JPEG (Joint Photographic Experts Group), JPEG2000, PNG (Portable Network Graphics), BMP (BitMaP), GIF (Graphic Interchange Format), and PDF (Portable Document Format). The delivery of scanned image may be via any communications method, protocol or combination thereof, for example, SOAP/XML (Simple Object Access Protocol/eXtensible Markup Language), DIME (Direct Internet Message Encapsulation), FTP, NFS (Network File System), SMTP (Simple Mail Transfer Protocol), HTTP/HTML (Hyper Text Transfer Protocol/Hyper Text Markup Language), AppleTalk, and a proprietary protocol over TCP/IP (Transmission Control Protocol/Internet Protocol). The scan-to-destination profile may additionally contain metadata that may be transmitted with the scanned image data. The metadata may comprise indications of how the scanned image data may be post-processed. Exemplary post-processing operations may include delivery to a designated client and OCR operations. The data generated by OCR processing may be further processed, such as for natural language translation or content summarization. A user may initiate a scanning process by selecting a scan-to-destination profile and subsequently scanning one or more documents.

The imaging device 10 functionality and user interface 16, 18 may be controlled by an external application residing on the remote computing device 12. One method for controlling an imaging device via an external application residing on a remote computing device is disclosed in U.S. patent application Ser. No. 10/962,248, entitled "Methods and Systems for Imaging Device Remote Application Interaction," filed on Oct. 8, 2004 which is hereby incorporated herein by reference.

In some exemplary embodiments, the imaging device 10 may register for and receive job completion notifications from the scan server 14. In some embodiments of the present invention, the scan server 14 may receive scanned image data from the imaging device 10, may post process the received scanned image data, may deliver the post-processed scanned image data to a final or intermediate destination, or may send notifications of the status of the post-processing.

In some embodiments of the present invention, the imaging device 10 may send an event notification to a client, for example, the scan server 14, when the imaging device 10 transfers a scanned image file. Exemplary operations in which a file transfer may occur include scan-to-destination, fax transmittal, offline storage transfer, and external translation operations. In some embodiments, the imaging device 10 may send an event notification when the file transfer is complete. In alternative embodiments, notification may be sent at the initiation of a file transfer. In still alternate embodiments, notification including progress updates may be sent periodically during file transfer. File transfer event notifications may be sent to multiple clients.

In some embodiments, a client recipient may be predefined, for example by a system administrator. In alternative embodiments, a client device may register to receive file transfer notification. A client device may register with an imaging device to receive notification using a registration message. A registration request message may be sent by any of numerous protocols including, for example, SOAP/XML, HTTP/HTML, or a proprietary protocol over TCP/IP. An exemplary SOAP/XML registration message may be:

```
<action type="register">
    <event type="file transfer" action="notify">
        <transfer-start>no</transfer-start>
        <transfer-progress>no</transfer-progress>
        <transfer-end>yes</transfer-end>
    </event>
    <destination>
        <address type="ip">ip_address</address>
        <protocol>SOAP</protocol>
    <destination>
</action>
``` where <transfer-start>no</transfer-start> indicates that the client does not request notification at the start of the transfer, <transfer-progress>no</transfer-progress> indicates that the client does not request notification of transfer progress, and <transfer-end>yes</transfer-end> indicates that the client requests notification at the end of the file transfer. The notification is to be sent to the address indicated by ip_address using SOAP protocol.

In some embodiments, the client device may only register after authentication of the client to the imaging device 10. In some embodiments, the imaging device 10 may impose restrictions on which events or operations a client may register for notification. In still alternate embodiments, a client device may receive notification of a file transfer based on data relating to the file-transfer operation. In some embodiments, the client device may only register after the imaging device 10 has announced (e.g., multicast, unicast, or broadcast) its presence or acceptance window for registration.

In some embodiments of the present invention, the scan server 14 may register with the imaging device 10 to receive event notification for events associated with scan-to-destination operations. Exemplary notifications include notification of availability of a scanned image that may be processed by the scan server 14 and file transfers to destinations that are accessible to the scan server 14. Exemplary methods of identifying scan-to-destination operations include identifying those operations associated with a particular group of scan-to-destination profiles and those operations associated with a particular remote application.

In some embodiments, the imaging device 10 may be controlled by an application residing on the remote computing device 12. Registered events may be associated with the application on the remote computing device 12, and the imaging device 10 may send notification of file transfers only when the imaging device 10 is under the control of the application on the remote computing 12.

The scan server 14 may monitor continuously for event notification. In some embodiments, the monitoring process may be associated with a port, protocol, or URI (Uniform Resource Identifier). When the network interface of the scan server 14 receives a notification, it may initiate or otherwise alert the scan processing process. Upon receipt of a notification, the scan server 14 may examine the notification to determine information carried by the notification. Exemplary information may include the location of the transferred file, the location of metadata associated with the transferred file, the metadata associated with the transferred file, ownership information, a timestamp, the originating device. An exemplary XML notification may be of the form:

```
<action type="notify">
    <event type="file transfer">
        <transfer-end>yes</transfer-end>
    </event>
    <file>file_path</file>
    <source>
        <address type="ip">ip_address</address>
        <remote-application>application_name</remote-application>
        <job id="...">
    </source>
    <final-destination>destination_info</final-destination>
    <response>
        <confirm-receipt>yes</confirm-receipt>
        <confirm-processing>yes</confirm-processing>
        <confirm-deliver>yes</confirm-delivery>
    </response>
    <actions>
        <OCR>yes</OCR>
    </actions>
</action>
``` where the action associated with a delivery file is independent of the location to which the file is delivered. In some embodiments, a processing queue may be implemented at the scan server 14 based on the order in which the event notifications are received.

In some embodiments, after the scan processing process has received and examined the notification, the scan processing process may initiate the processing of the scanned image data. The processing may commence immediately in some embodiments, or in alternate embodiments, the processing may be deferred, for example, in queue-based processing. In some embodiments, validation actions may be performed after the scan server 14 receives the event notification. Exemplary validation actions include verifying the data in the event notification, verifying the data is present and complete at the specified location, verifying format and version support for the data, verifying that the specified requested action is supported, and authentication of the request. In some embodiments, the scan server 14 may acknowledge receipt of the scanned image data in a message to the imaging device 10. An exemplary acknowledgement message in XML format may be:

```
<action type="notify">
    <event type="file transfer">
        <confirm-receipt>yes</confirm-receipt>
    </event/
    <file>file_path</file>
    <destination>
        <address type="ip">ip_address</address>
        <job id="...">
    </destination>
</action>
``` where ip_address is the address of the imaging device 10.

In some embodiments, when the imaging device 10 receives confirmation from the scan server 14 that the scanned image data has been received, the imaging device 10 may display on the front panel display 17 a confirmation message that the scan server 14 has accepted the scanned image data for processing. In some embodiments, the front panel confirmation may be under the control of an application on the remote computing device 12 after the imaging device 10 has relayed the receipt confirmation message from the scan server 14 to the remote computing device 12. The imaging device 10 may update a dynamic record for the scan job to indicate that it was accepted by the scan server 14 for processing. The imaging device 10 may be released to proceed to the next operation. Secondary notification may be sent by the imaging device 10 to another client upon receipt of confirmation of receipt of the scanned image data from the scan server 14. Other clients may include, for example, a job accounting server and an auditing server. The dynamic record for the scan job may maintain a notification history or a notification state.

The scan processing process may initiate post-processing actions associated with the scanned image data. Exemplary post-processing actions may include OCR, Bates stamping, indexing, content auditing, content filtering, image enhancement, compression, encryption, merging of multiple scanned images (also considered composition), format conversion, spelling/grammar correction, and natural language translation. Any combination or number of post-processing actions may be combined.

In some embodiments of the present invention, the post-processing actions to be performed on scanned image data may be specified in the file-transfer event, may be specified in the metadata associated with the scanned image data, may be inferred from the delivery destination, may be inferred from a profile associated with the user who initiated the scan-to-destination operation, or may be derived dynamically from the contents of the scanned image data. In some embodiments of the present invention, the scan server 14 may send a notification to the imaging device 10 upon completion of a post-processing action. Notification may also be sent to any client device that has registered for notification of a particular post-processing action event.

In some embodiments, the notification may be sent by an individual post-processing application. In alternative embodiments, the scan server directing the post-processing actions may send the notification. In alternate embodiments in which an external application is controlling the post-processing actions, the external application may send notifications.

Upon receipt of a post-processing notification, the imaging device 10 may display on the front panel display 17 a confirmation message that the post-processing action has been completed. In some embodiments, the front panel confirmation may be under the control of an application on the remote computing device 12 after the imaging device 10 has relayed the post-processing notification message from the scan server 14 to the remote computing device 12. The imaging device 10 may update a dynamic record for the scan job to indicate that the post-processing action has been completed The imaging device 10 may be released to proceed to the next operation. Secondary post-processing notification may be sent by the imaging device 10 to another client upon receipt of the post-processing notification. Other clients may include, for example, a job accounting server and an auditing server. In some embodiments, notifications associated with post-processing may include notification of when a post-processing action is scheduled, status notification on the progress of a post-processing step, and notification of requests for resources or configuration information.

After completion of post processing, the scan server 14 may transmit the post-processed scanned image data to its final destination. Exemplary methods by which the post-processed scanned image data may be sent include according to a method specified in an event, by a method registered by a client, or by a method predefined at the scan server 14. In some embodiments of the present invention, after the post-processed scanned image data is successfully transmitted to its final destination, the scan server 14 may send a confirmation message (final-delivery notification) to the imaging device 10 indicating the successful transfer of the data. Or upon failure, a message indicating the failure of data transfer.

Upon receipt of a final-delivery notification, the imaging device 10 may display on the front panel display 17 a message reflecting the final-delivery status of the post-processed scanned image data. In some embodiments, the front panel confirmation may be under the control of an application on the remote computing device 12 after the imaging device 10 has relayed the final-delivery notification message from the scan server 14 to the remote computing device 12. The imaging device 10 may update a dynamic record for the scan job to indicate the final-delivery status. The imaging device 10 may be released to proceed to the next operation. Secondary final-delivery notification may be sent by the imaging device 10 to another client upon receipt of the final-delivery notification. Other clients may include, for example, a job accounting server and an auditing server.

Figure 2:
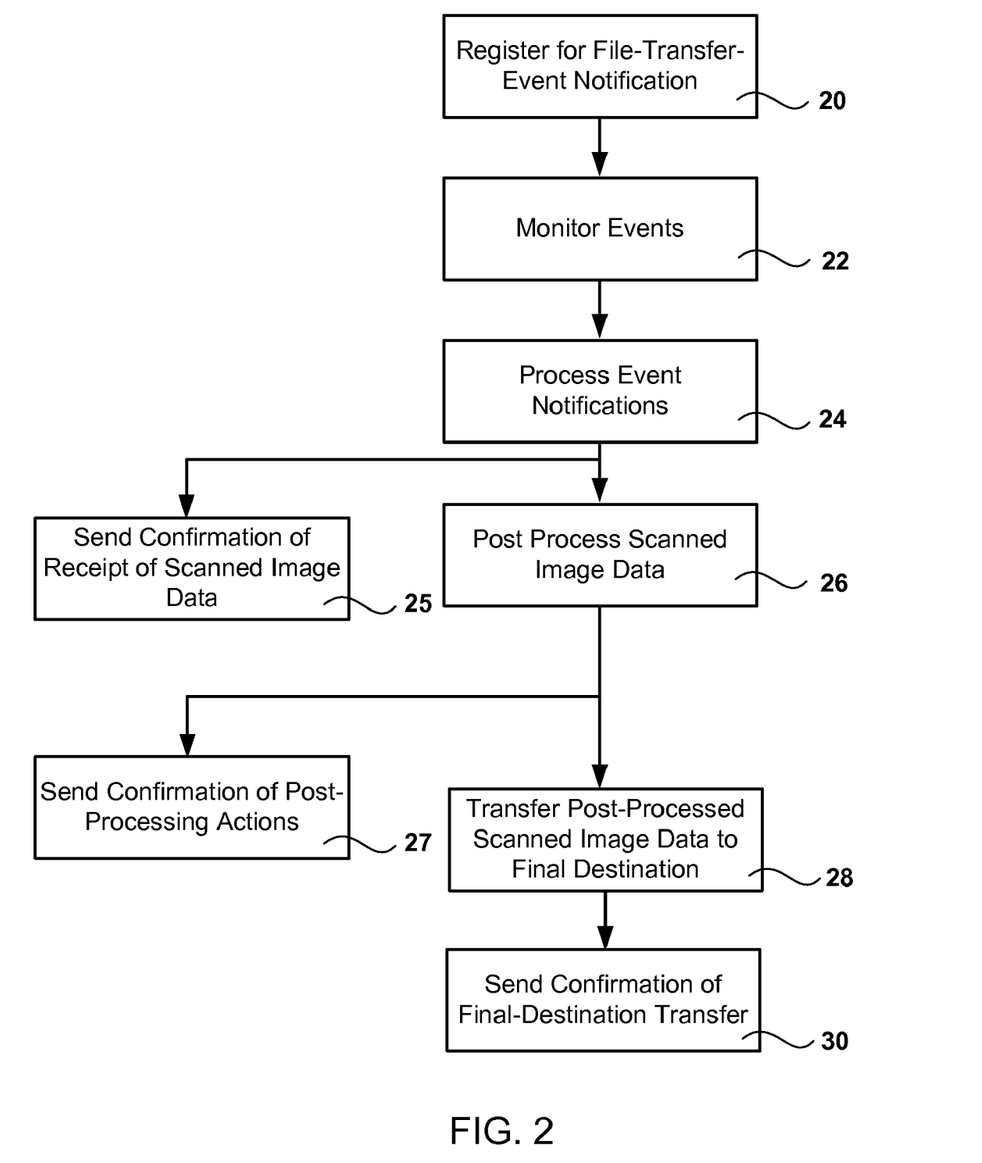
FIG. 2. is a diagram showing embodiments of the present invention comprising a scan server that may register to receive event notifications and may monitor events.

Some embodiments of the present invention may be described in relation to FIG. 2. A client device, for example a scan server, may register 20 with an imaging device to receive notification of a file-transfer event. The scan server may then continuously monitor 22 events. Upon receipt of an event notification, the scan server may process 24 the event notification, and if the scanned image data has been successfully received at the scan server, the scan server may send 25 a receipt of confirmation to the imaging device. The scan server may also initiate post processing 26 of the scanned image data. Upon completion of each post-processing action, the scan server may send 27 notification confirming the completion of the post-processing action to the imaging device. After all post-processing actions have terminated, the scan server may transfer 28 the post-processed scanned image data to a final destination. Upon transfer of the post-processed image data to the final destination, the scan server may send 30 a final-destination transfer confirmation to the imaging device.

Figure 3:
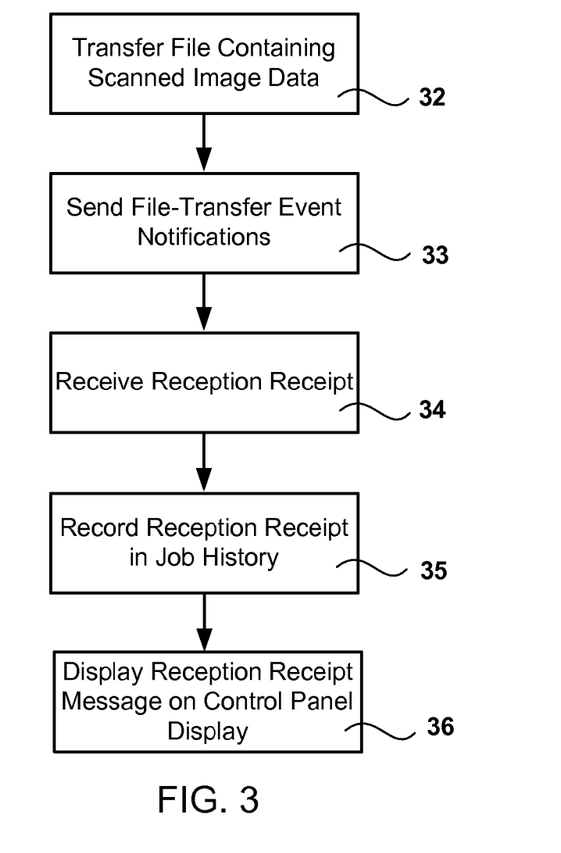
FIG. 3 is a diagram showing embodiments of the present invention comprising an imaging device that may send and receive event notifications.

Some embodiments of the present invention may be described in relation to FIG. 3. An imaging device may after transferring 32 a file containing scanned image data, send 33 file-transfer event notifications to client devices. Upon receiving 34 a receipt indicating reception of the scanned image data by a receiving device, the imaging device may record 35 in a job history that the scanned image data was received, as evidenced by the receipt. The imaging device may then display 36 a message to this effect on the display of either a local or external control panel.

Figure 4:
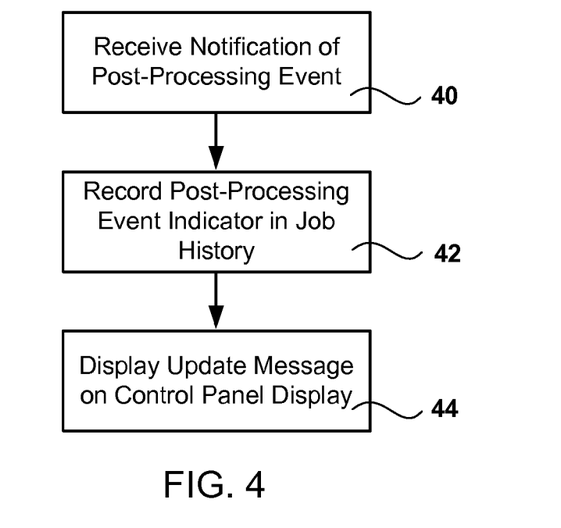
FIG. 4 is a diagram showing embodiments of the present invention comprising an imaging device that may receive post-processing event notifications and display update messages on a control panel display.

Some embodiments of the present invention may be described in relation to FIG. 4. After receiving 40 notification of a post-processing event from a scan server, an imaging device may record 42 in a job history that the post-processing event has occurred, as evidenced by receipt of the notification. The imaging device may then display 44 a message to this effect on the display of either a local or external control panel.

Figure 5:
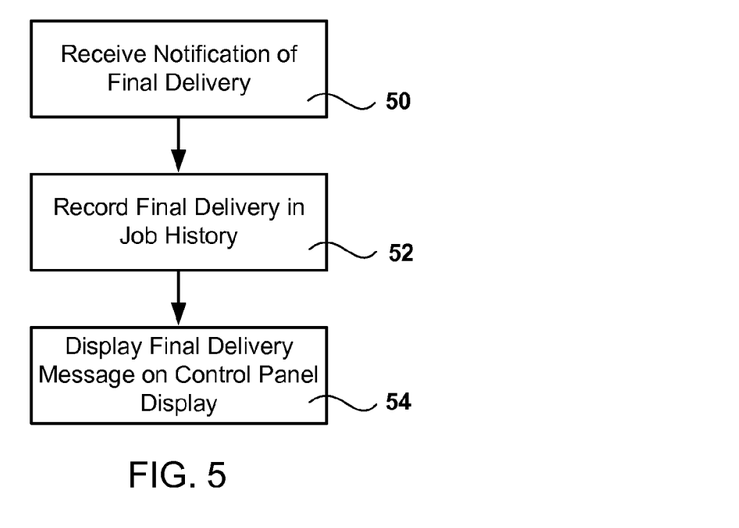
FIG. 5 is a diagram showing embodiments of the present invention comprising an imaging device that may receive final-delivery event notifications and display update messages on a control panel display.

Some embodiments of the present invention may be described in relation to FIG. 5. After receiving 50 notification from a scan server that post processed scanned image data has been delivered to its final destination, an imaging device may record 52 in a job history that the final delivery has occurred, as evidenced by receipt of the final-delivery notification. The imaging device may then display 54 a message to this effect on the display of either a local or external control panel.

In some embodiments of the present invention, an imaging device may associate a job-tracking identifier with the scanned image data generated at the imaging device. In some embodiments, the job-tracking identifier may comprise a communication address of the originating source, for example, the communication address of the imaging device. In some embodiments, the job-tracking identifier may comprise a globally unique identifier (GUID), for example a GUID generated by the Microsoft GUID generator.

In some embodiments of the present invention, the job-tracking identifier may be embedded in metadata associated with the scanned image. In alternative embodiments, the job-tracking identifier may be embedded in the scanned image data. In some embodiments, the job-tracking identifier may be encrypted. In alternate embodiments, the job-tracking identifier may be part of the encryption key for the image content embedded in the encrypted job identifier. For example, in some embodiments of the present invention, a first key may be used to decrypt an encryption header. The decrypted header may comprise a second key for decrypting the image content in addition to additional information, for example, the job identifier.

Figure 6:
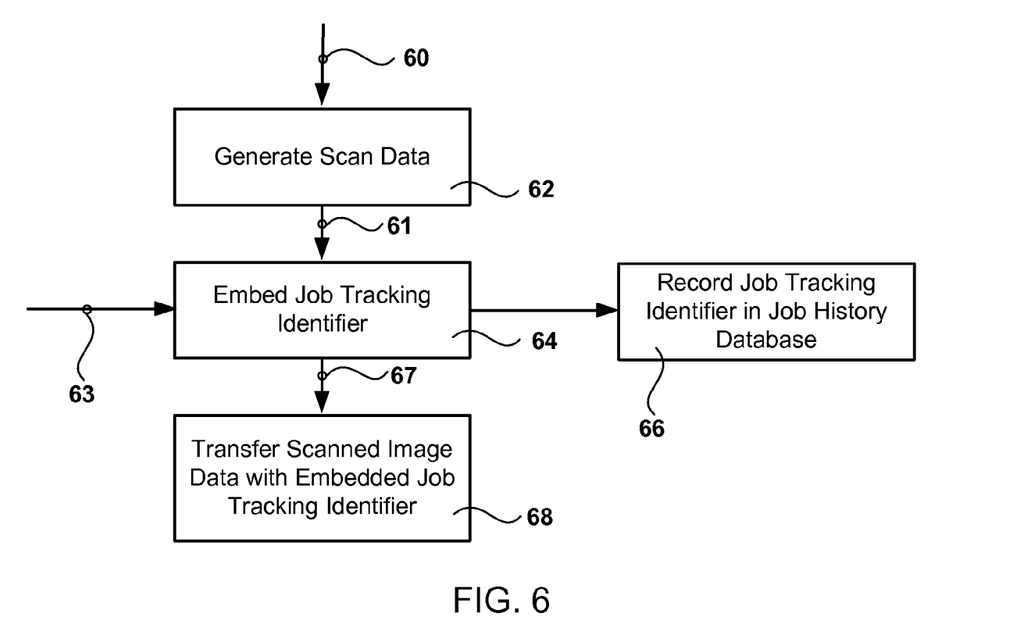
FIG. 6 is a diagram showing embodiments of the present invention comprising embedding a document tracking identifier in scanned image data.

Some embodiments of the present invention may described in relation to FIG. 6. An imaging device may generate 62 scanned image data 61 from an input document 60. The imaging device may then embed 64 a document tracking identifier into the scanned image data 61. The document tracking identifier may comprise the communication address of the imaging device. In alternative embodiments, the document tracking identifier may comprise additional information 63, for example a globally unique identifier. After embedding 64 the document tracking identifier into the scanned image data, the imaging device may record 66 the document tracking identifier in a job history database maintained by the imaging device. In some embodiments, the job history database may reside on the imaging device. In alternative embodiments, the job history database may be external to the imaging device. The scanned image data embedded with the document tracking identifier 67 may be transferred 68 as in a scan-to-destination operation. In some embodiments, the document tracking identifier may be persistent over the life-cycle of the document.

In some embodiments, the imaging device may receive notifications on subsequent use or processing downstream from the scan server and associated post-processing services, for example, when the scanned image data is viewed, when the scanned image data is altered or destroyed, and when the scanned image data is transferred. In some embodiments, the scanned image data and any documents derived from the scanned image data may be maintained within a system that is compatible with the event notification system to the imaging device. In these embodiments, processes to view, duplicate, modify, destroy, and otherwise access and process the scanned image data and documents derived from the scanned image data may only be performed by applications that support event notification according to the embodiments of the present invention.

Some embodiments of the present invention comprise a secure operating environment. Alternative embodiments of the present invention, may enforce security by encrypting scanned image data and documents derived from the scanned image data using a symmetric or public key, or keys, associated with an application compatible with event notifications. In such embodiments, attempts to view or otherwise access the scanned image data and documents derived from the scanned image data using applications that do not support the event notifications may be unsuccessful since such applications may not have the matching symmetric or private key required to decrypt the data.

In some embodiments of the present invention, when a derived document is subsequently processed after final delivery, the application performing the processing may extract from the document the document tracking identifier and may send a notification to the imaging device. The notification may comprise information regarding the processing action and the completion status. The imaging device may update the dynamic job record associated with the originally scanned image data. Exemplary subsequent processing operations may include viewing, printing, modifying content, exporting, copying, and destroying the document.

Figure 7:
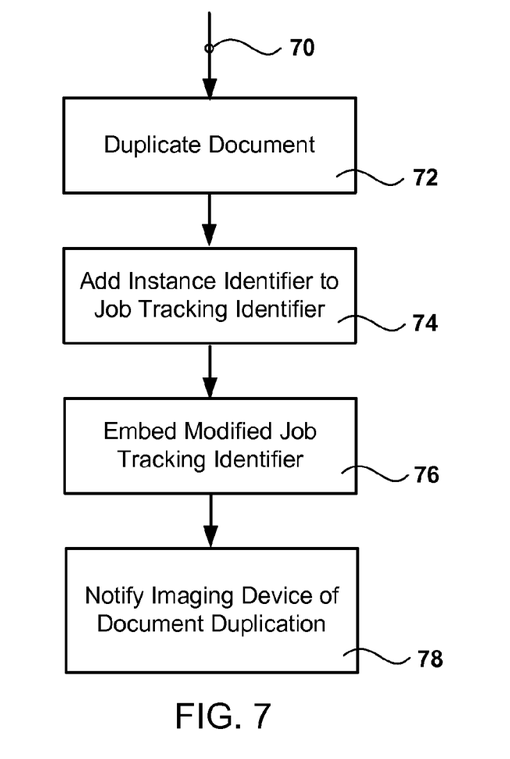
FIG. 7 is a diagram showing embodiments of the present invention comprising document duplication notification.

Some embodiments of the present invention may be described relative to FIG. 7. If subsequent processing of a derived document 70 comprises electronic duplication 72, the document tracking identifier associated with the originally scanned image data may be modified 74 and embedded 76 in the electrically duplicated document. In some embodiments, modification of the document tracking identifier may comprise adding an instance identifier to the document tracking identifier. The imaging device may be notified 78 of the document duplication. In some embodiments, notification may additionally contain the instance information. In these embodiments, the imaging device may create a branch in the job history log corresponding to the instance. Notification to the imaging device of processing actions on the duplicate document may be updated in the job history log at the corresponding branch by the imaging device.

In some embodiments of the present invention, when a derived document is destroyed, a notification of the destruction of the derived document may be sent to the imaging device. Exemplary action which may be viewed as document destruction include deleting the document record from the file system, deleting the document content from the file system, and obscuring the deleted document contents from data recovery. The imaging device may then update the job history record to indicate the destruction of the document. In some embodiments, the imaging device may freeze the job history. Any subsequence notifications relating to the document may be flagged. In some embodiments, an alert to a system administrator may be generated by the imaging device.

Figure 8:
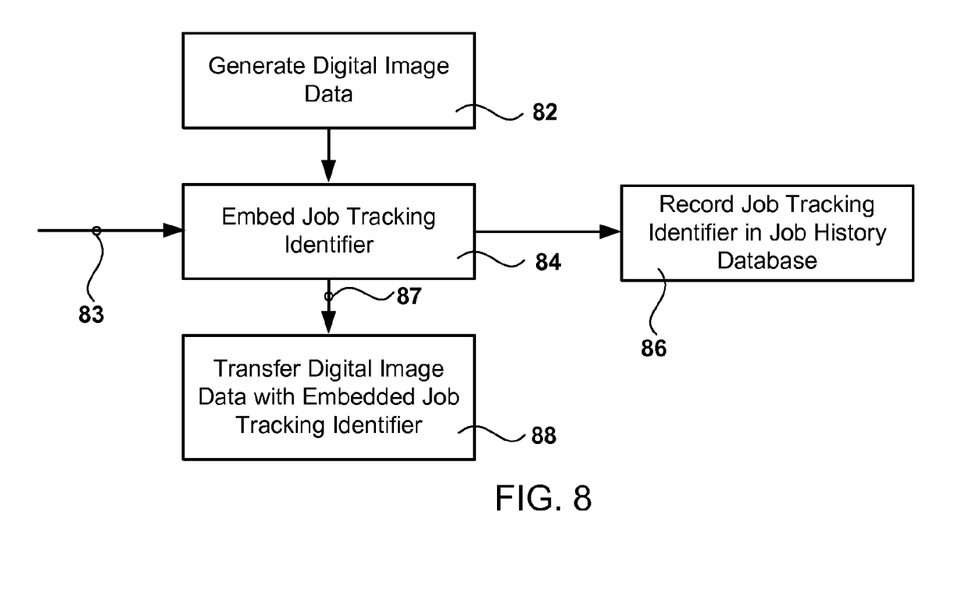
FIG. 8 is a diagram showing embodiments of the presenting invention comprising embedding a document tracking identifier in digital image data.

Some embodiments of the present invention may described in relation to FIG. 8. An imaging device may generate 82 digital image data. In alternative embodiments, the imaging device may receive the digital image data. The imaging device may then embed 84 a document tracking identifier into the digital image data. The document tracking identifier may comprise the communication address of the imaging device. In alternative embodiments, the document tracking identifier may comprise additional information 83, for example a globally unique identifier. After embedding 84 the document tracking identifier into the digital image data, the imaging device may record 86 the document tracking identifier in a job history database maintained by the imaging device. In some embodiments, the job history database may reside on the imaging device. In alternative embodiments, the job history database may be external to the imaging device. The digital image data embedded with the document tracking identifier 87 may be transferred 88 to a processing server. In some embodiments, the document tracking identifier may be persistent over the lifecycle of the document.

In some embodiments, the imaging device may receive notifications on subsequent use or processing downstream from the processing server, for example, when the digital image data is viewed, when the digital image data is altered or destroyed, and when the digital image data is transferred. In some embodiments, the digital image data and any documents derived from the digital image data may be maintained within a system that is compatible with the event notification system to the imaging device. In these embodiments, processes to view, duplicate, modify, destroy, and otherwise access and process the digital image data and documents derived from the digital image data may only be performed by applications that support event notification according to the embodiments of the present invention.

Figure 9:
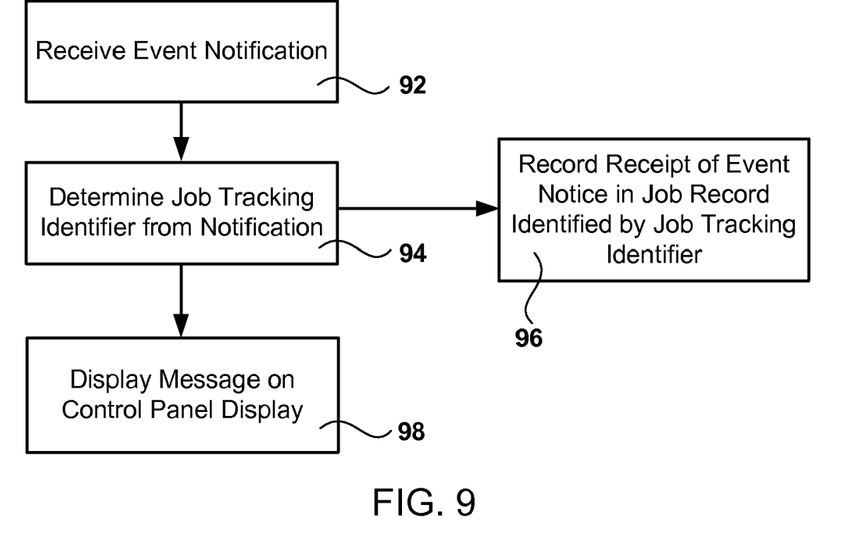
FIG. 9 is a diagram showing embodiments of the present invention comprising receiving event notification at an imaging device and recording receipt of the event notification in a job record.

Some embodiments of the present invention may be described in relation to FIG. 9. An imaging device may receive 92 event notification from a processing server. The imaging device may determine 94 the job tracking identifier from the event notification and record 96 receipt of the event notification in the job record associated with the job tracking identifier. In some embodiments, the job record may be part of a job history database that may be maintained by the imaging device. In some embodiments, the job record may reside on the imaging device. In alternate embodiments, the job record may reside on a storage medium that may be external to the imaging device. The imaging device may display 98, on a control panel display associated with the imaging device, a message reflecting the receipt 92 of the event notification or a message related to the processing associated with the notification.

Some embodiments of the present invention comprise a secure operating environment. Alternative embodiments of the present invention, may enforce security by encrypting digital image data and documents derived from the digital image data using a symmetric or public key, or keys, associated with an application compatible with event notifications. In such embodiments, attempts to view or otherwise access the digital image data and documents derived from the digital image data using applications that do not support the event notifications may be unsuccessful since such applications may not have the matching symmetric or private key required to decrypt the data.

In some embodiments of the present invention, when a derived document is subsequently processed after final delivery, the application performing the processing may extract from the document the document tracking identifier and may send a notification to the imaging device. The notification may comprise information regarding the processing action and the completion status. The imaging device may update the dynamic job record associated with the original digital image data. Exemplary subsequent processing operations may include viewing, printing, modifying content, exporting, copying, and destroying the document.

Figure 10:
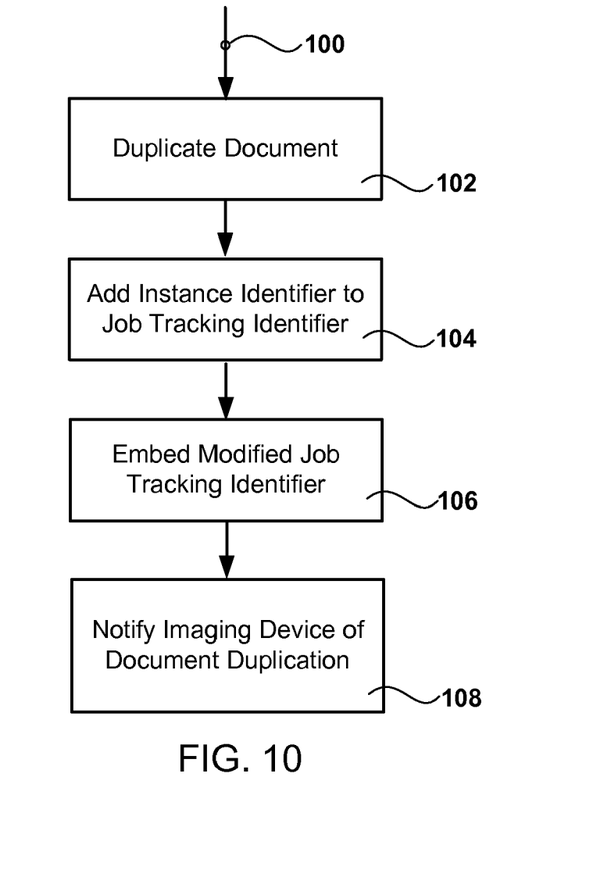
FIG. 10 is a diagram showing embodiments of the present invention comprising document duplication notification.

Some embodiments of the present invention may be described relative to FIG. 10. If subsequent processing of a derived document 100 comprises electronic duplication 102, the document tracking identifier associated with the originally generated digital image data may be modified 104 and embedded 106 in the electrically duplicated document. In some embodiments, modification of the document tracking identifier may comprise adding an instance identifier to the document tracking identifier. The imaging device may be notified 108 of the document duplication. In some embodiments, notification may additionally contain the instance information. In these embodiments, the imaging device may create a branch in the job history log corresponding to the instance. Notification to the imaging device of processing actions on the duplicate document may be updated in the job history log at the corresponding branch by the imaging device.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for tracking digital image data, said method comprising:
   generating digital image data on an imaging device;
   associating a document tracking identifier with said digital image data, wherein said document tracking identifier comprises the communication address of said imaging device and a globally unique identifier for said digital image data;
   recording said document tracking identifier in a first job history record maintained by said imaging device, thereby associating said document tracking identifier with said first job history record;
   notifying a processing server of the availability of said digital image data;
   notifying said processing server of said document tracking identifier associated with said digital image data;
   receiving a receipt notification for said digital image data from said processing server at said imaging device, whereby said receipt notification indicates the receipt of said digital image data at said processing server from said imaging device and comprises said document tracking identifier;
   recording receipt of said receipt notification in said first job history record;
   in response to said receiving, releasing said imaging device to proceed to a next operation; and
   notifying a client of said receiving of said receipt notification for said digital image data.

2. A method according to claim 1, wherein said imaging device is a multi-function peripheral device.

3. A method according to claim 1, wherein said document tracking identifier is embedded in said digital image data.

4. A method according to claim 1, wherein said document tracking identifier is embedded in metadata associated with said digital image data.

5. A method according to claim 1, wherein said document tracking identifier is encrypted.

6. A method according to claim 1 further comprising:
   receiving a post-processing action notification associated with said digital image data from said processing server at said imaging device, whereby said post-processing action notification comprises said document tracking identifier; and
   recording receipt of said post-processing action notification in said first job history record.

7. A method according to claim 1 further comprising:
   receiving a final-delivery notification associated with said digital image data from said processing server at said imaging device, whereby said final-delivery notification comprises said document tracking identifier; and
   recording receipt of said final-delivery notification in said first job history record.

8. A method according to claim 1 further comprising:
   receiving a duplication notification associated with said digital image data from a remote computing device at said imaging device, whereby said duplication notification indicates duplication of said digital image data and comprises said document tracking identifier;
   receiving a modified document tracking identifier from said remote computing device at said imaging device, whereby said modified document tracking identifier is associated with said duplication of said digital image data;
   establishing a second job history record associated with said modified tracking identifier and said first job history record; and
   recording said modified document tracking identifier in said second job history record.

9. The method according to claim 1 further comprising:
   receiving a destruction notification associated with said digital image data from a first remote computing device at said imaging device, whereby said destruction notification indicates the destruction of said digital image data and comprises said document tracking identifier;
   recording receipt of said destruction notification in said first job history record; and
   receiving a subsequent notification associated with said digital image data from a second remote computing device at said imaging device, wherein said subsequent notification is received at said imaging device after said destruction notification;
   generating an alert related to said subsequent notification at said imaging device; and
   sending said alert to an administrative computing device.

10. A method for tracking digital image data, said method comprising:
    generating digital image data on an imaging device;
    associating a document tracking identifier with said digital image data, wherein said document tracking identifier comprises the communication address of said imaging device and a globally unique identifier for said digital image data;
    recording said document tracking identifier in a job history record maintained by said imaging device, thereby associating said document tracking identifier with said job history record;
    notifying a processing server of the availability of said digital image data;
    notifying said processing server of said document tracking identifier associated with said digital image data;
    receiving a receipt notification for said digital image data from said processing server at said imaging device, whereby said receipt notification indicates the receipt of said digital image data at said processing server from said imaging device and comprises said document tracking identifier;

recording receipt of said receipt notification in said job history record;

in response to said receiving said receipt notification, releasing said imaging device to proceed to a next operation;

receiving an event notification comprising said document tracking identifier;

recording receipt of said event in said job history record; and notifying a client of said receiving of said receipt notification for said digital image data.

11. A method according to claim 10, wherein said document tracking identifier is embedded in said digital image data.

12. A method according to claim 10, wherein said document tracking identifier is embedded in metadata associated with said digital image data.

13. A method according to claim 10, wherein said document tracking identifier is encrypted.

14. A method according to claim 10, wherein said event notification comprises notification of post processing of said digital image data.

15. A method according to claim 10, wherein said event notification comprises:

notification of duplication associated with said digital image data; and a modified document tracking identifier.

* * * * *